UNITED STATES PATENT OFFICE.

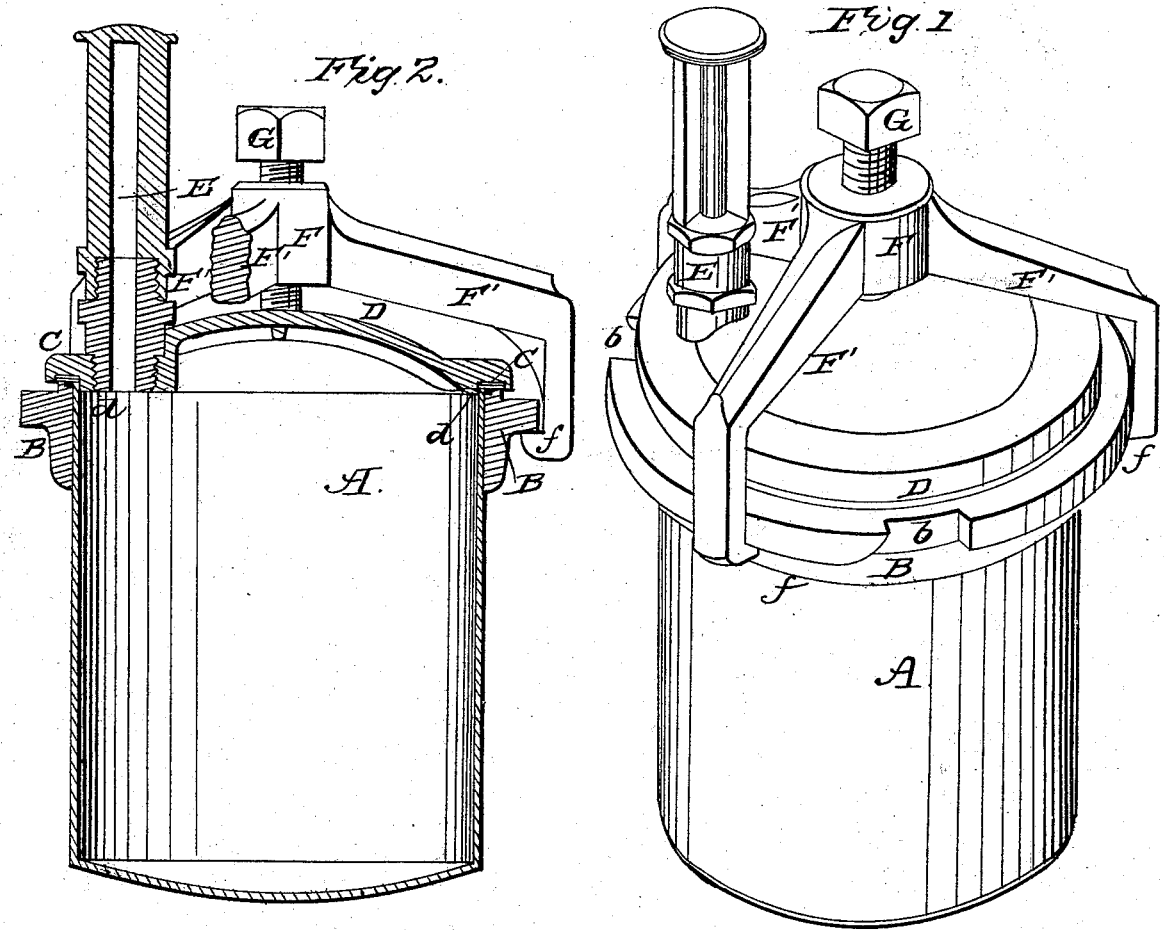

CHARLES H. JAMES, OF CINCINNATI, OHIO.

IMPROVED DENTIST'S VULCANIZER.

Specification forming part of Letters Patent No. 56,945, dated August 7, 1866.

*To all whom it may concern:*

Be it known that I, CHARLES H. JAMES, of Cincinnati, Hamilton county, and State of Ohio, have invented certain new and useful Improvements in Dentists' Vulcanizers; and I do hereby declare the following to be a full, clear, and exact description thereof, reference being had to the accompanying drawings, making part of this specification.

My invention relates to the construction of a joint-fastening for the covers of dentists' vulcanizing-chambers, whereby the said covers can be attached to or removed from the vessel much more readily than with the old devices for fastening, and whereby a tighter and more perfect joint can be secured, the pressure upon the gasket, with my improved fastening, being more uniformly distributed than by any previously-known devices.

In the accompanying drawings, Figure 1 is a perspective view of a dentist's vulcanizer embodying my improvements. Fig. 2 is a vertical section of the same.

A is the vulcanizing-chamber, provided with a flange, B, which is provided with an elevated and ground seat for the gasket C. D is the cover, having an annular projection, $d$. An annular groove in the cover, as shown, retains the gasket C in place. E is the ordinary thermometer-stand. F is a yoke constructed with three arms, F', and provided with a set-screw, G.

The lips $f$ of the arms are adapted, when passed through the notches $b$ in the flange B, to pass round under the flange B by the twisting of the yoke, and by the tightening of set-screw G the cover D is tightly secured to the vessel.

The set-screw G being central, the pressure on the gasket C is, of course, equable, and a uniformly-tight joint is secured, and the disengagement of the yoke and screw-fastening is not rendered difficult by the heating of the screw-fastenings or gasket in the use of the vulcanizer.

This peculiar fastening is much more simple than all devices hitherto used, and can be attached and detached much more readily.

An inferior modification of this device may have two arms in the place of three.

I claim herein as new and of my invention—

The yoke F F' $f$, central set-screw, G, and notched flange B $b$, arranged and operating substantially as and for the purpose specified.

In testimony of which invention I hereunto set my hand.

CHARLES H. JAMES.

Witnesses:
GEO. H. KNIGHT,
JAMES H. LAYMAN.